(12) United States Patent
Thapliya et al.

(10) Patent No.: US 7,450,788 B1
(45) Date of Patent: Nov. 11, 2008

(54) OPTICAL SPLITTER/COUPLER AND OPTICAL COMMUNICATION SYSTEM

(75) Inventors: Roshan Thapliya, Kanagawa (JP); Takashi Kikuchi, Kanagawa (JP); Shigetoshi Nakamura, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 52 days.

(21) Appl. No.: 11/809,657

(22) Filed: Jun. 1, 2007

(30) Foreign Application Priority Data

Oct. 25, 2006 (JP) ............... 2006-289564

(51) Int. Cl.
*G02F 1/295* (2006.01)
(52) U.S. Cl. ............... 385/9; 385/11; 385/14; 385/27; 385/28; 385/40; 385/42; 385/45; 385/130; 385/131; 385/132
(58) Field of Classification Search ............ 385/8, 385/9, 11, 15, 16, 27, 28, 31, 37, 14, 39, 385/40, 42, 43, 44, 45, 129, 130, 131, 132
See application file for complete search history.

(56) References Cited

U.S. PATENT DOCUMENTS

| | | | |
|---|---|---|---|
| 6,266,464 B1 * | 7/2001 | Day et al. | 385/37 |
| 6,374,013 B1 * | 4/2002 | Whiteaway et al. | 385/37 |
| 6,421,478 B1 * | 7/2002 | Paiam | 385/24 |
| 6,436,613 B1 * | 8/2002 | Fallahi et al. | 430/321 |
| 7,330,614 B1 * | 2/2008 | Mossberg et al. | 385/14 |
| 7,403,678 B2 * | 7/2008 | Thapliya et al. | 385/20 |

FOREIGN PATENT DOCUMENTS

JP    2004-279637    10/2004

* cited by examiner

*Primary Examiner*—Brian M Healy
(74) *Attorney, Agent, or Firm*—Fildes & Outland, P.C.

(57) ABSTRACT

An optical splitter/coupler has: a multimode waveguide having an electrooptic effect, and propagating light in a multimode; one incident waveguide propagating light in a single mode, and inputting the light to the multimode waveguide; one pair of emitting waveguides guiding-out, in a single mode, lights which have propagated-in through the multimode waveguide; at least one pair of individual electrodes provided so as to be positioned in vicinities of respective side edges on one surface of the multimode waveguide; and a ground electrode provided on another surface, wherein the multimode waveguide has a length such that 3(n+1) bright spots arise at a central portion and at both side edge portions due to incident light, the individual electrodes are provided at positions corresponding to an upstream-most one pair of the bright spots, and the emitting waveguides are connected to positions corresponding to a downstream-most one pair of the bright spots.

22 Claims, 17 Drawing Sheets

OPTICAL SPLITTER/COUPLER AND OPTICAL COMMUNICATION SYSTEM

CROSS-REFERENCE TO RELATED APPLICATION

This application is based on and claims priority under 35 USC 119 from Japanese Patent Application No. 2006-289564 filed Oct. 25, 2006.

BACKGROUND

1. Technical Field

The present invention relates to an optical splitter/coupler, and in particular, to, in an optical splitter/coupler which splits light incident from one incident waveguide into two emitting waveguides, an optical splitter/coupler which can arbitrarily change the intensity ratio of the light which is emitted from one emitting waveguide and the light which is emitted from the other emitting waveguide, and, in an optical splitter/coupler which guides light incident from two incident waveguides out to one emitting waveguide, an optical splitter/coupler which can arbitrarily set the ratio at which the light incident from one incident waveguide and the light incident from the other incident waveguide are to be emitted from the emitting waveguide. The present invention further relates to an optical communication system using the optical splitter/coupler.

2. Related Art

An optical splitter/coupler is an important part in structuring an optical network. Optical splitting/coupling elements which have been used in conventional optical networks are passive elements, and can only split an optical signal at a fixed ratio.

It is thought that an optical splitter/coupler, which can greatly change the ratio of splitting the light, is needed in order to construct a more flexible optical network.

SUMMARY

An aspect of the present invention is an optical splitter/coupler having: a multimode waveguide having an electrooptic effect, and propagating light in a multimode; one incident waveguide propagating light in a single mode, and inputting the light to one end of the multimode waveguide; one pair of emitting waveguides guiding-out, in a single mode, lights which have propagated-in through the multimode waveguide; at least one pair of individual electrodes provided so as to be positioned in vicinities of respective side edges of the multimode waveguide, on one surface of the multimode waveguide; and a ground electrode provided on another surface of the multimode waveguide, wherein the multimode waveguide has a length such that $3(n+1)$ (where n is a natural number) bright spots arise at a central portion and at both side edge portions due to light incident from the incident waveguide, the individual electrodes are provided in a pair at positions corresponding to an upstream-most one pair of the bright spots, and the emitting waveguides are connected to positions corresponding to a downstream-most one pair of the bright spots at the multimode waveguide.

BRIEF DESCRIPTION OF THE DRAWINGS

Exemplary embodiments of the present invention will be described in detail based on the following figures, wherein.

DETAILED DESCRIPTION

Figure 1:
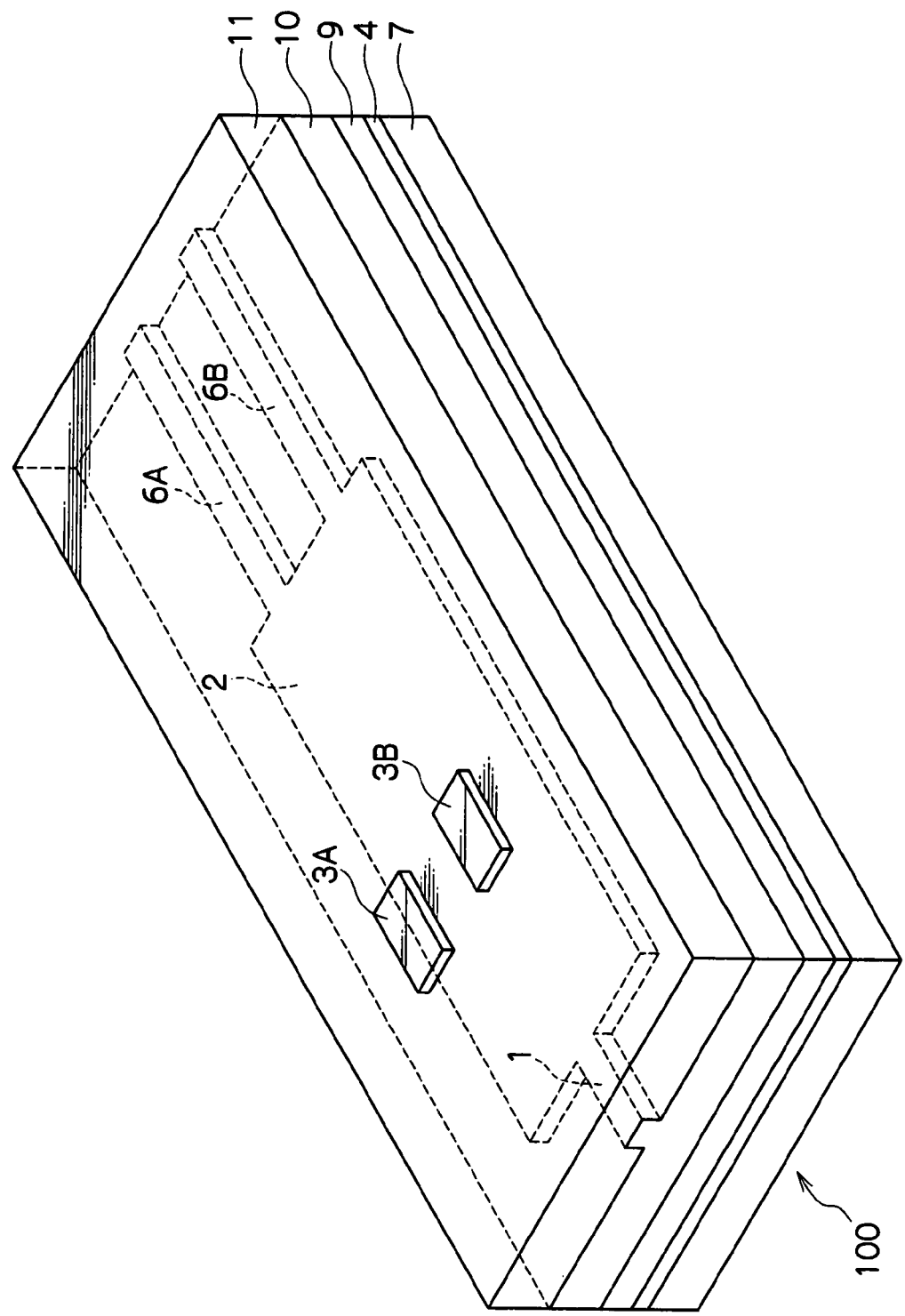
FIG. 1 is a perspective view showing the overall structure of an optical splitter/coupler relating to a first exemplary embodiment.

The present invention provides an optical splitter/coupler having: a multimode waveguide having an electrooptic effect, and propagating light in a multimode; one incident waveguide propagating light in a single mode, and inputting the light to one end of the multimode waveguide; one pair of emitting waveguides guiding-out, in a single mode, lights which have propagated-in through the multimode waveguide; at least one pair of individual electrodes provided so as to be positioned in vicinities of respective side edges of the multimode waveguide, on one surface of the multimode waveguide; and a ground electrode provided on another surface of the multimode waveguide, wherein the multimode waveguide has a length such that $3(n+1)$ (where n is a natural number) bright spots arise at a central portion and at both side edge portions due to light incident from the incident waveguide, the individual electrodes are provided in a pair at positions corresponding to an upstream-most one pair of the bright spots, and the emitting waveguides are connected to positions corresponding to a downstream-most one pair of the bright spots at the multimode waveguide.

In the above-described optical splitter/coupler, the light which has propagated-in in the single mode through the incident waveguide is dispersed at the connected portion of the incident waveguide and the multimode waveguide, and is made incident into the multimode waveguide in the multimode.

Here, the multimode waveguide is formed to a length such that $3(n+1)$ (where n is a natural number) bright spots arise at a central portion and at both side edge portions due to the light which is incident from the incident waveguide. Further, the one incident waveguide is connected to the central portion of the upstream side edge of the multimode waveguide. Accordingly, when the light is incident from the incident waveguide into the multimode waveguide, bright spots arise in a vicinity of the central portion and in vicinities of the both side edge portions of the multimode waveguide. Further, the two bright spots, which arise in the vicinities of the both side edge portions, are positioned at the downstream side of the one bright spot which is in the vicinity of the central portion. At the multimode waveguide, there are formed n+1 sets of this set of a total of three bright spots which arise in a vicinity of the central portion and in vicinities of the both side edge portions in this way. Moreover, the emitting waveguides are connected to positions of the multimode waveguide corresponding to the pair of bright spots which is positioned the furthest downstream, i.e., corresponding to two bright spots which arise in the vicinities of the both side edge portions. Therefore, the light, which has propagated through the multimode waveguide in the multimode, is converged into single mode lights at the connected portions of the multimode waveguide and the emitting waveguides, and propagated through the emitting waveguides in the single mode.

Accordingly, the bright spots arise both at the connected portion of the incident waveguide and the multimode waveguide and at the connected portions of the multimode waveguide and the emitting waveguides. Further, due to the lights which are propagated in the multimode interfering with one another, bright spots are formed as well at the interior of the multimode waveguide.

Here, because the individual electrodes are formed at positions corresponding to bright spots formed at the multimode waveguide, when electric fields are applied to the individual electrodes, the electrooptic property changes at the portion where the lights within the multimode waveguide interfere with one another, and the phases of the lights passing through this portion become offset.

Accordingly, the intensity ratio of the bright spot at the place where the one emitting waveguide is connected and the bright spot at the place where the other emitting waveguide is connected, varies as compared with a case in which electric fields are not applied. Therefore, the light intensities emitted from the emitting waveguides also change.

In the above-described optical splitter/coupler, the intensity ratio of the light emitted from one emitting waveguide and the light emitted from the other emitting waveguide can be arbitrarily changed in this way.

The present invention also provides an optical splitter/coupler having: a multimode waveguide having an electrooptic effect, and propagating light in a multimode; one pair of incident waveguides propagating lights in a single mode, and inputting the lights to one end of the multimode waveguide; one emitting waveguide guiding-out, in a single mode, light which has propagated-in through the multimode waveguide; at least one pair of individual electrodes provided so as to be positioned in vicinities of respective side edges of the multimode waveguide, on one surface of the multimode waveguide; and a ground electrode provided on another surface of the multimode waveguide, wherein the multimode waveguide has a length such that $3(n+1)$ (where n is a natural number) bright spots arise at a central portion and at both side edge portions due to the lights incident from the incident waveguides, the individual electrodes are provided at positions corresponding to a one pair of the bright spots which one pair is second from an upstream side, and the emitting waveguide is connected to a position corresponding to a downstream-most one of the bright spots at the multimode waveguide.

In the above-described optical splitter/coupler, the lights, which have propagated-in in the single mode through the incident waveguides, form bright spots at the connected portions of the incident waveguides and the multimode waveguide, and simultaneously disperse, and are made incident into the multimode waveguide in the multimode.

Here, the multimode waveguide is formed to a length such that $3(n+1)$ (where n is a natural number) bright spots arise at a central portion and at both side edge portions due to the lights which are incident from the incident waveguides. Further, the two incident waveguides are connected to the end portion at the upstream side. Therefore, when the lights are incident from the both incident waveguides, bright spots arise in vicinities of the both side edges and in a vicinity of the central portion of the multimode waveguide, and the one bright spot in the vicinity of the central portion is positioned at the downstream side of the two bright spots which arise in the vicinities of the both side edge portions. In this way, at the multimode waveguide, there are formed n+1 sets of this set of the three bright spots which arise in a vicinity of the central portion and in vicinities of the both side edge portions. Moreover, the emitting waveguide is connected to a position of the multimode waveguide corresponding to the one bright spot which is positioned the furthest downstream. Therefore, the light, which has propagated through the multimode waveguide in the multimode, is converged into single mode light at the connected portion of the multimode waveguide and the emitting waveguide, and is propagated through the emitting waveguide in the single mode.

Accordingly, the bright spots arise both at the connected portions of the incident waveguides and the multimode waveguide and at the connected portion of the multimode waveguide and the emitting waveguide. Further, due to the lights which are propagated in the multimode interfering with one another, bright spots are formed as well at the interior of the multimode waveguide.

Here, because the individual electrodes are formed at positions corresponding to bright spots formed at the multimode waveguide, when electric fields are applied to the individual electrodes, the electrooptic property changes at the portion where the lights within the multimode waveguide interfere with one another, and the phases of the lights passing through this portion become offset.

Accordingly, the intensity ratio of the bright spot at the place where the one incident waveguide is connected and the bright spot at the place where the other incident waveguide is connected, varies as compared with a case in which electric fields are not applied. Therefore, the light intensities incident from the incident waveguides to the multimode waveguide also change.

1. First Exemplary Embodiment (1) Structure

As shown in FIG. 1 through FIG. 4, an optical splitter/coupler 100 relating to a first exemplary embodiment has one incident waveguide 1, two emitting waveguides which are emitting waveguide 6A and emitting waveguide 6B (upon occasion called "emitting waveguides 6" when referred to collectively hereinafter), a multimode waveguide 2 to whose one end the incident waveguide 1 is connected and to whose other end the emitting waveguides 6 are connected, and two individual electrodes which are individual electrode 3A and individual electrode 3B (upon occasion called "individual electrodes 3" when referred to collectively hereinafter) to which voltages are applied in order to modulate the light propagating within the multimode waveguide 2.

Figure 2:
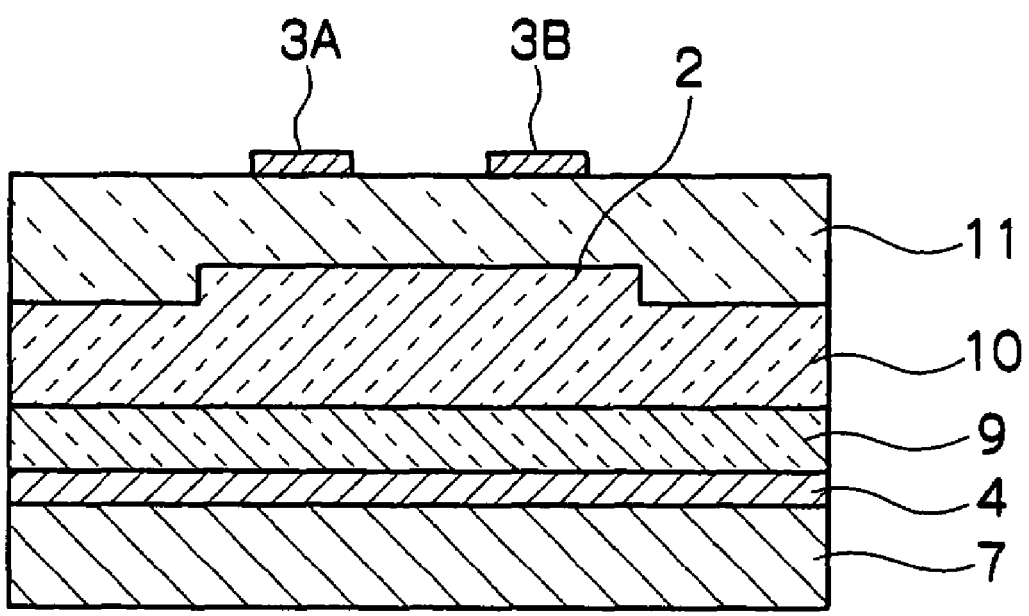
FIG. 2 is a cross-sectional view showing a cross-section taken by cutting the optical splitter/coupler relating to the first exemplary embodiment along a transverse direction.
Figure 3:
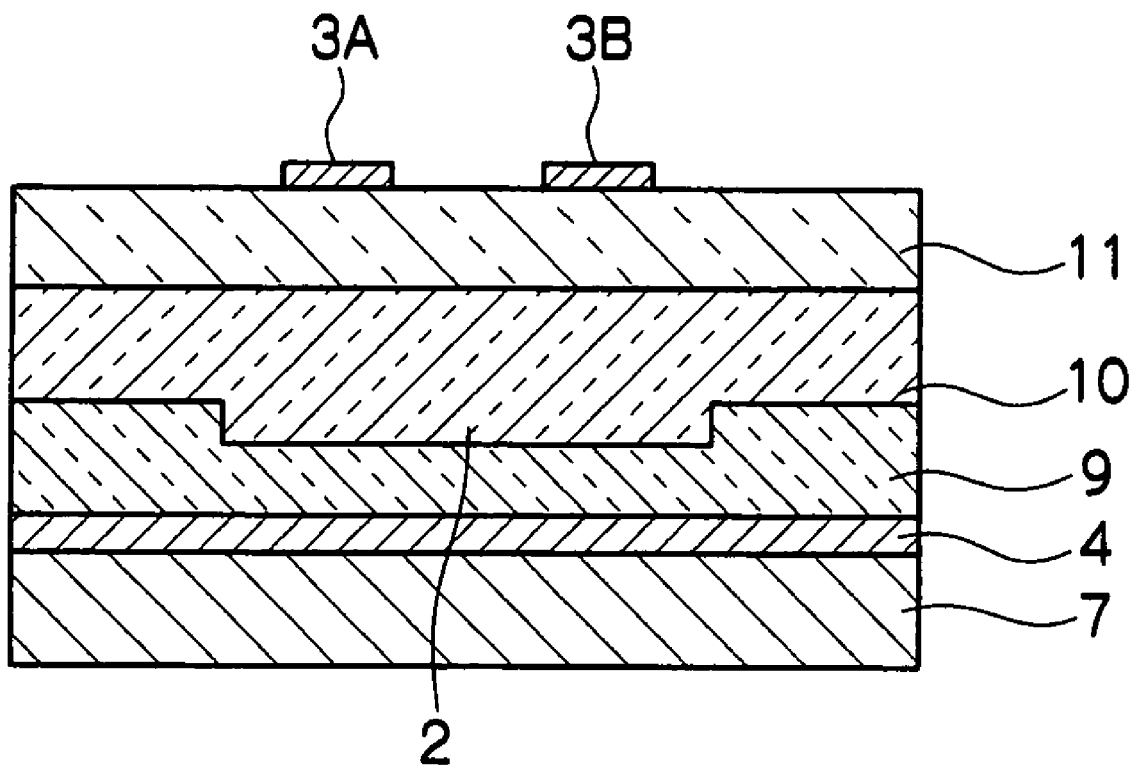
FIG. 3 is a cross-sectional view showing a cross-section taken by cutting another example of the optical splitter/coupler relating to the first exemplary embodiment along the transverse direction.

As shown in FIG. 2 and FIG. 3, the incident waveguide 1, the emitting waveguide 6A, the emitting waveguide 6B, and the multimode waveguide 2 are formed integrally by a core layer 10 which is sandwiched between a lower clad layer 9 and an upper clad layer 11. The core layer 10 has a refractive index which is greater than those of the lower clad layer 9 and the upper clad layer 11. Note that the refractive indices of the lower clad layer 9 and the upper clad layer 11 may be the same or may be different.

The lower clad layer 9 is formed on the surface of a substrate 7. A ground electrode 4, which is grounded such that the electrical potential is 0, is formed between the lower clad layer 9 and the substrate 7.

The incident waveguide 1, the emitting waveguides 6 and the multimode waveguide 2 may be waveguides having ribbed structures which project in the shapes of ribs toward the upper clad layer 11 as shown in FIG. 2, or may be waveguides having inverse-ribbed structures which project in the shapes of ribs toward the lower clad layer 9 as shown in FIG. 3. If the incident waveguide 1, the emitting waveguides 6 and the multimode waveguide 2 are waveguides having ribbed structures, due to the modulating signals applied to the individual electrodes 3, large electric fields arise from the core layer 10, and specifically from the multimode waveguide 2, and therefore, even if the modulating signals are low voltage, light can be modulated more efficiently at the multimode waveguide 2. Note that, in a case in which the incident waveguide 1, the emitting waveguides 6 and the multimode waveguide 2 cannot be formed by etching the core layer 10 for some reason, the incident waveguide 1, the emitting waveguides 6 and the multimode waveguide 2 can be formed as waveguides having inverse-ribbed structures by etching the lower clad layer 9 in a predetermined shape, and thereafter, casting a forming solution for forming the core layer 10, and heating and curing it.

Figure 4:
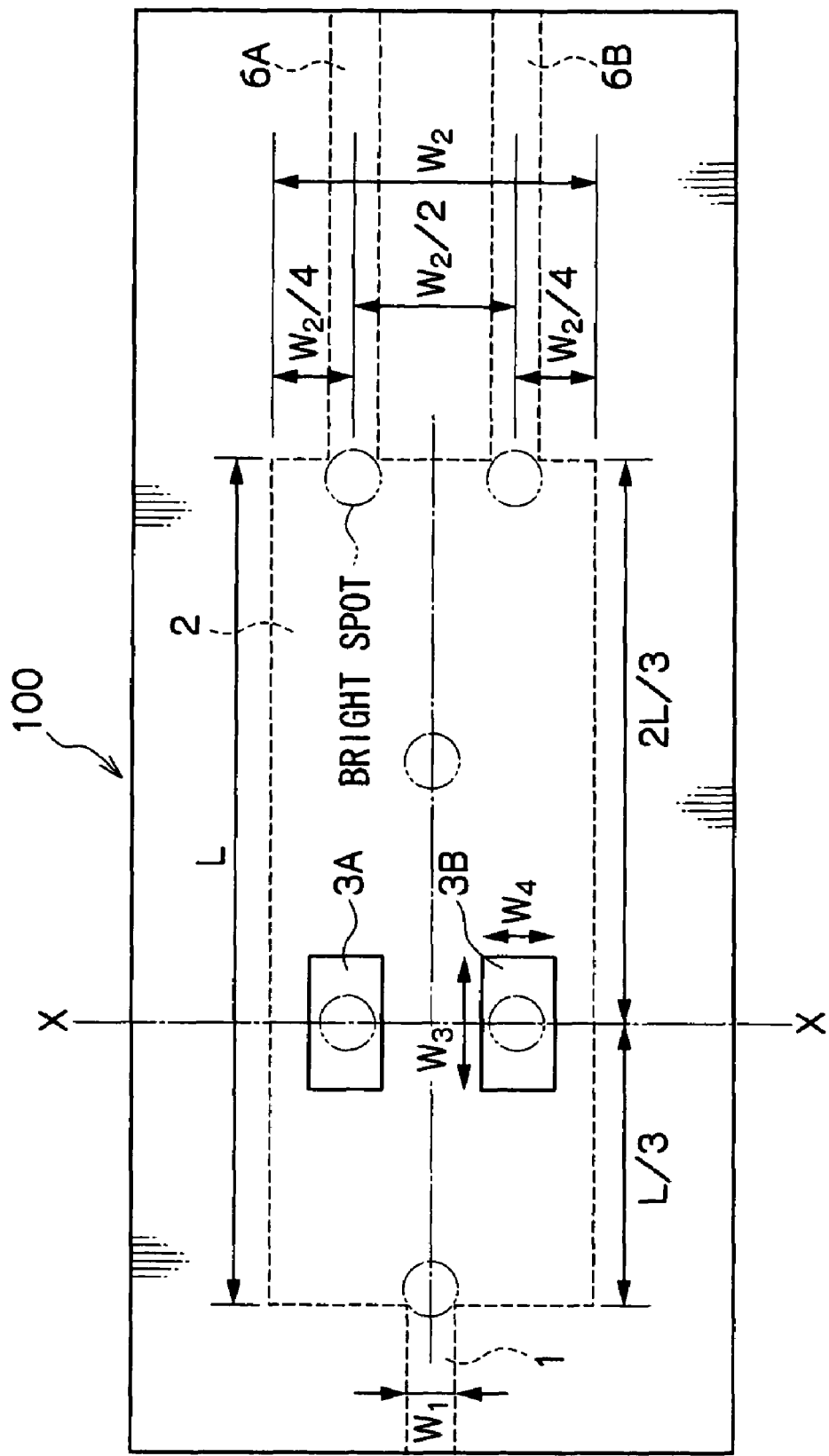
FIG. 4 is a plan view showing the relative positional relationships among an incident waveguide, a multimode waveguide, emitting waveguides, and a pair of individual electrodes, in the optical splitter/coupler relating to the first exemplary embodiment.

As shown in FIG. 4, the incident waveguide 1 and the emitting waveguides 6 have a same width $W_1$. A width $W_2$ of the multimode waveguide 2 satisfying the relational expression:

$$1 < W_2/W_1 < 100$$

is preferable in carrying out multimode transmission stably at the multimode waveguide 2.

A length L of the multimode waveguide 2 can be set as a function of a difference $\Delta n$ between a refractive index $n_2$ of the lower clad layer 9 and the upper clad layer 11 and a refractive index $n_1$ of the core layer 10, and the width $W_1$ of the incident waveguide 1 and the emitting waveguides 6, and the width $W_2$ of the multimode waveguide 2.

In the optical splitter/coupler 100, various optical modes are excited within the multimode waveguide 2 by the light incident from the incident waveguide 1, and, these various modes interfere and bright spots arise at the portion of the multimode waveguide 2 where the incident waveguide 1 is joined thereto and at predetermined places of the multimode waveguide 2. Specifically, as shown in FIG. 4, bright spots arise at the portion of the multimode waveguide 2 joined together with the incident waveguide 1 and the portions joined together with the emitting waveguide 6A and the emitting waveguide 6B. Further, a total of three bright spots, which are two in the vicinity of both side edges at either side of a longitudinal direction central line and one on this central line, arise from the incident waveguide 1 toward the emitting waveguides 6. Accordingly, the length L is set such that a total of six bright spots, which are one bright spot, two bright spots, one bright spot, two bright spots, are formed from the incident waveguide 1 toward the emitting waveguides 6. However, the length L may be set such that, from the incident waveguide 1 toward the emitting waveguides 6, a total of nine bright spots, which are one bright spot, two bright spots, one bright spot, two bright spots, one bright spot, two bright spots, are formed, or a total of twelve bright spots, which are one bright spot, two bright spots, one bright spot, two bright spots, one bright spots, two bright spots, one bright spots, two bright spots, are formed.

Figure 5:
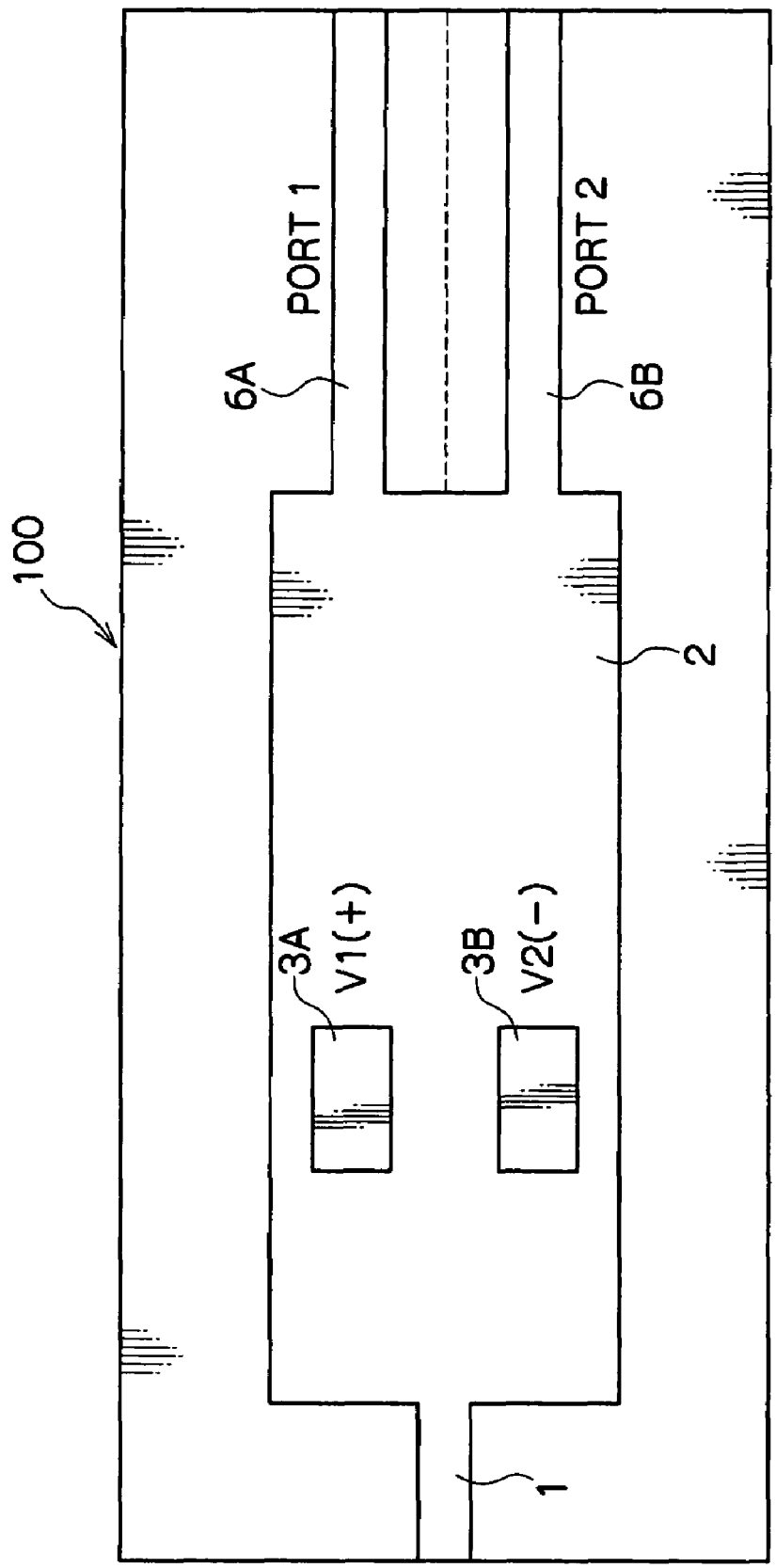
FIG. 5 is a plan view showing a state in which voltages are applied to the individual electrodes in an aspect in which the multimode waveguide has been subjected to polarization orienting processing at the same polarity, in the optical splitter/coupler relating to the first exemplary embodiment.
Figure 6:
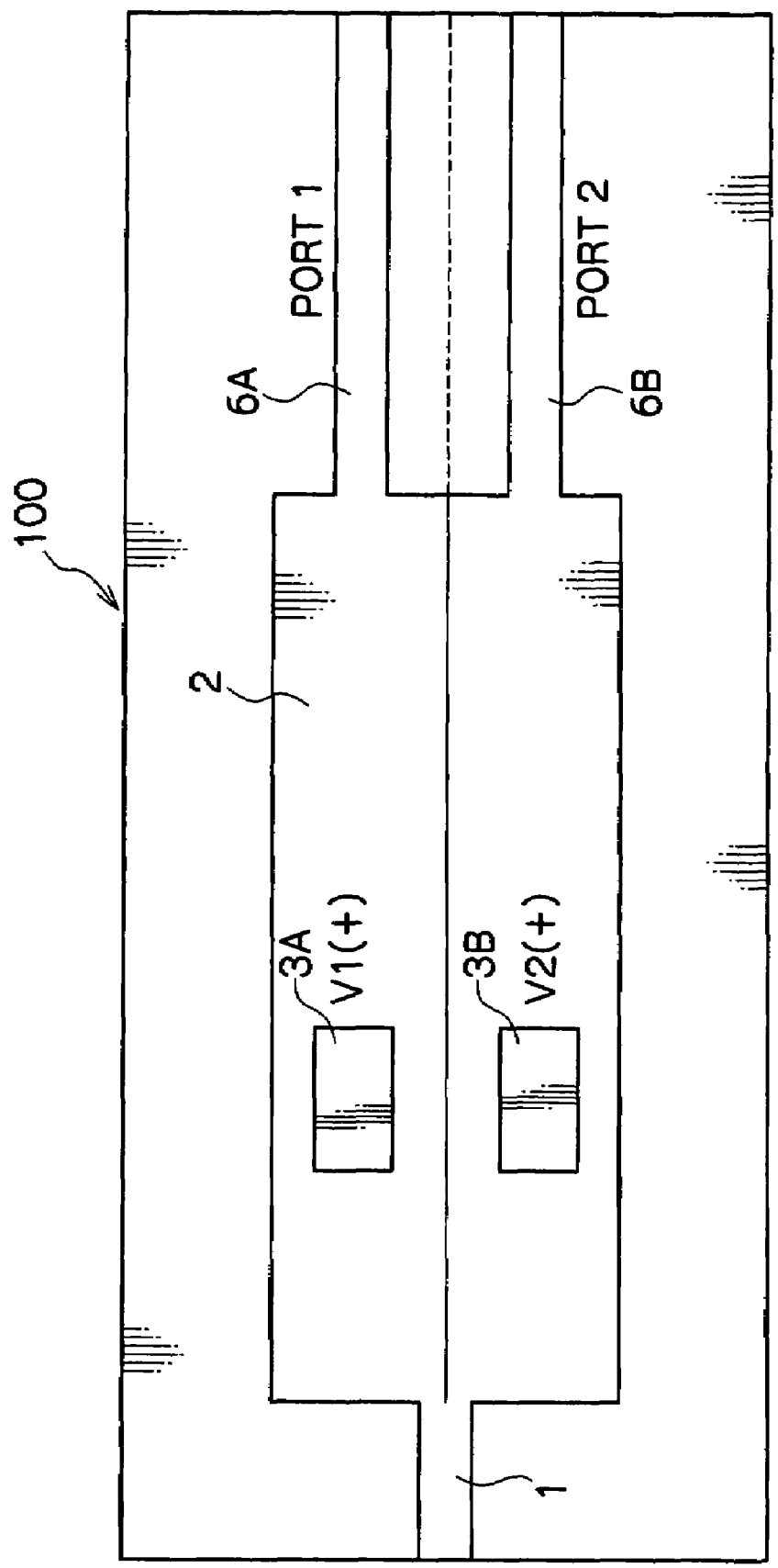
FIG. 6 is a plan view showing a state in which voltages are applied to the individual electrodes in an aspect in which the multimode waveguide has been subjected to polarization orienting processing at opposite polarities at respective sides of a longitudinal direction central line, in the optical splitter/coupler relating to the first exemplary embodiment.

An electrooptic effect is imparted to the multimode waveguide 2 due to predetermined electric fields being applied and a polarization orienting processing being carried out. This polarization orienting processing may be carried out by applying electric fields of the same direction to the multimode waveguide 2 overall as shown in FIG. 5. Or, it may be carried out by applying electric fields of opposite directions at either side of a central line which runs along the longitudinal direction of the multimode waveguide 2, as shown in FIG. 6.

As shown in FIG. 1 through FIG. 4, the individual electrodes 3 are disposed above the multimode waveguide 2 at the surface of the upper clad layer 11 on either side of the longitudinal direction central line, and are formed so as to overlap the positions of the upstream-most bright spots among the sets of two bright spots which arise at either side of the longitudinal direction central line. One of the individual electrodes 3 is formed so as to cover the multimode waveguide 2 from one side edge forming a long side of the multimode waveguide 2, toward the central portion. The other individual electrode 3 is formed so as to cover the multimode waveguide 2 from the other side edge forming a long side of the multimode waveguide 2, toward the central portion. One of each of the individual electrodes 3 may be provided, i.e., the individual electrodes 3 may be provided as one pair, as shown in FIGS. 1 through 4, or two of each, i.e., two pairs, may be provided, or three of each, i.e., three pairs, may be provided. When two pairs of the individual electrodes 3 are provided, it suffices to provide them at positions at which, among the bright spots which arise on either side of the longitudinal central line, the bright spots at the upstream-most side and the bright spots which are second from the upstream side arise. Further, when three pairs of the individual electrodes 3 are provided, it suffices to provide them at positions at which, among the bright spots which arise on either side of the longitudinal central line, the bright spots at the upstream-most side and the bright spots which are second from the upstream side and the bright spots which are third from the upstream side arise.

The dimension of the individual electrode 3 in the short side direction of the multimode waveguide 2, i.e., width $W_4$, is less than or equal to ½ of the width $W_2$ of the multimode waveguide 2. Further, the dimension of the individual electrode 3 in the long side direction of the multimode waveguide 2, i.e., length $W_3$, may be the same as or may be different than the width $W_4$. However, it is preferable that the length $W_3$ be shorter than the length L of the multimode waveguide 2.

The individual electrode 3A and the individual electrode 3B are connected to respective dc power sources (not shown). In a case in which the multimode waveguide 2 on the whole is polarization orienting processed to the same polarity, as shown in FIG. 5, the polarities of the dc voltages applied from the one dc power source and the other dc power source are opposite one another. On the other hand, in a case in which the multimode waveguide 2 is polarization orienting processed to opposite polarities at either side of the longitudinal direction central line, because voltages of the same polarities can be applied to the individual electrodes 3, the individual electrodes 3 can be connected to a single dc power source, and the structure of the voltage applying circuit can be simplified.

As shown in FIG. 4, the interval between the central lines of the two emitting waveguides 6 is $W_2/2$, and the distances from the side edges of the multimode waveguide 2 to the central lines of the emitting waveguides 6 are $W_2/4$ respectively.

Any material, provided that it is a material having an electrooptic effect such that the refractive index changes when an electric field is applied thereto and that it is a material which is transparent with respect to the light which is to be modulated, can be used as the materials of the core layer 10, the upper clad layer 11, and the lower clad layer 9. Examples include light-transmitting polymer materials, such as acrylic resin, epoxy resin, polyethylene terephthalate resin, polycarbonate resin, polyurethane resin, polyimide resin, fluorinated polyimide resin, polyetherimide resin, polysulfone resin, polyethersulfone resin, polyarylate resin, polysiloxane resin, or the like, or silicon oxide, various types of glass, strontium titanate, gallium arsenide, indium phosphide, or the like. Note that, when using the aforementioned light-transmitting polymers, in order to manifest a nonlinear optical effect, it is preferable to either disperse a dye which has an electrooptic effect, or to join a group having a nonlinear optical effect to the main chain or a side chain.

Examples of the materials of the individual electrodes 3 and the ground electrode 4 are various types of metal materials and metal oxides which are known as materials for electrodes, such as aluminum, titanium, gold, copper, ITO, and the like.

(2) Fabrication Processes

Figure 17:
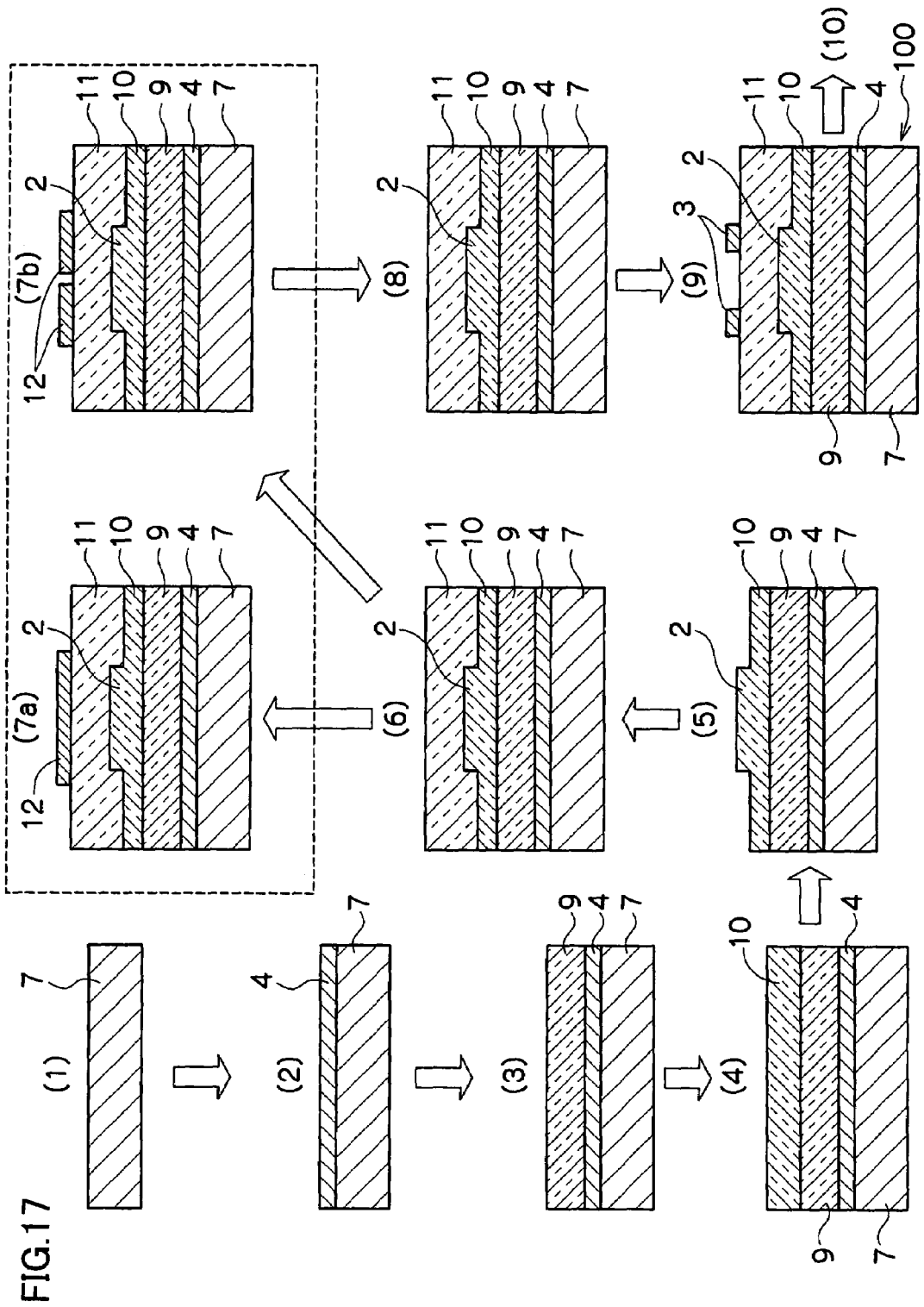
FIG. 17 is a process diagram showing processes of fabricating the optical splitter/coupler relating to the first exemplary embodiment.

The optical splitter/coupler 100 can be fabricated by the processes shown in FIG. 17.

Figure 8:
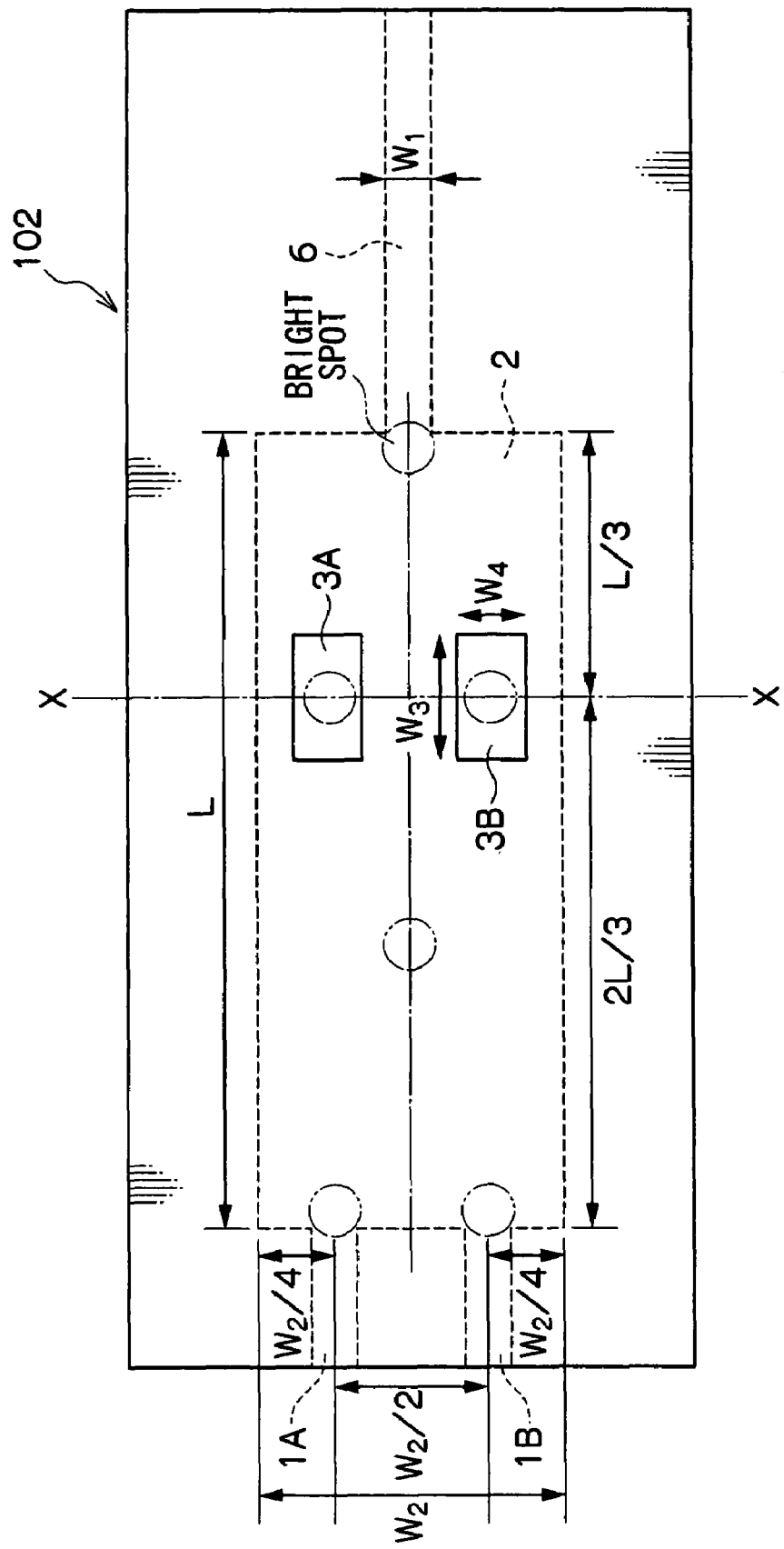
FIG. 8 is a plan view showing the relative positional relationships among incident waveguides, a multimode waveguide, an emitting waveguide, and a pair of individual electrodes, in the optical splitter/coupler relating to the second exemplary embodiment.

First, the substrate 7 is readied as shown in (1) in FIG. 8. A substrate formed of an arbitrary material, such as a glass substrate, a quartz substrate, a silicon substrate, a polyimide substrate, or the like can be used as the substrate 7. If a silane coupling agent or the like is coated on the substrate 7, the ability thereof to adhere with the ground electrode 4 can be improved.

Next, as shown in (2) of FIG. 17, the ground electrode 4 is formed on the surface of the substrate 7. The ground electrode 4 may be formed by vapor-depositing or plating a metal such as aluminum, titanium, gold, copper, or the like on the surface of the substrate 7. Further, for the ground electrode 4, a foil of any of these metals may be laminated.

After the ground electrode 4 is formed, as shown in (3) in FIG. 17, the lower clad layer 9 is formed on the surface of the ground electrode 4. First, a solution of a light-transmitting polymer, which forms the lower clad layer 9, is coated on the surface of the ground electrode 4. Examples of methods of coating this solution on the ground electrode 4 are curtain coating, extrusion molding coating, roll coating, spin coating, dip coating, bar coating, spray coating, slide coating, printing, and the like. When the solution of the above-described material is coated on the substrate, it is heated and the solvent is distilled-off, and reacting and curing are carried out as needed, so as to form the lower clad layer 9.

Next, as shown in (4) in FIG. 17, the core layer 10 is formed on the surface of the lower clad layer 9. The core layer 10 can be formed, for example, by coating a solution of a light-transmitting polymer which forms the core layer 10 onto the surface of the lower clad layer 9, and heating and curing it. The same methods as those mentioned above in relation to the lower clad layer 9 can be used as the method for coating this solution.

When the core layer 10 has been formed, as shown in (5) in FIG. 17, the waveguides, such as the incident waveguide 1, the emitting waveguides 6, the multimode waveguide 2, or the like are formed at the core layer 10. An example of the method for forming the waveguides is a method such as etching or the like. Further, the waveguides may be formed by forming recessed portions of shapes corresponding to the waveguides in the lower clad layer 9, and coating a light-transmitting polymer solution from thereabove and heating and curing it.

Next, as shown in (6) in FIG. 17, the upper clad layer 11 is formed on the core layer 10, and seed electrode(s) 12 formed from a metal covering film is/are formed thereon (as shown in (7a) and (7b) in FIG. 17). The seed electrode(s) 12 can be formed in the same way as the ground electrode 4. In a case in which the entire multimode waveguide 2 is to be polarization orienting processed to the same polarity, as shown in (7a), the seed electrode 12 is formed so as to cover the entire multimode waveguide 2. On the other hand, in a case in which the multimode waveguide 2 is to be polarization orienting processed to opposite polarities at respective sides of the longitudinal direction central line, as shown in (7b), the seed electrodes 12 are formed such that one of the seed electrodes 12 covers the half of the multimode waveguide 2 at one side of the longitudinal direction central line, and the other seed electrode 12 covers the half of the multimode waveguide 2 at the other side of the longitudinal direction central line.

When the seed electrodes 12 have been formed, predetermined voltages are applied to the seed electrodes 12 and electric fields are applied to the core layer 10, and the portions of the core layer 10 where the incident waveguide 1, the emitting waveguides 6, and the multimode waveguide 2 are formed are polarization orienting processed.

When the polarization orienting processing is finished, as shown in (8) in FIG. 17, the seed electrodes 12 are removed, and, as shown in (9), the individual electrodes 3 are formed on the surface of the upper clad layer 11. Note that, instead of removing the seed electrodes 12, the individual electrodes 3 may be formed by etching the seed electrodes 12 in the planar shapes of the individual electrodes 3 and increasing the thickness of the seed electrodes 12 by a method such as electroplating or the like.

In this way, the optical splitter/coupler 100 can be formed.

(3) Operation

Figure 9:
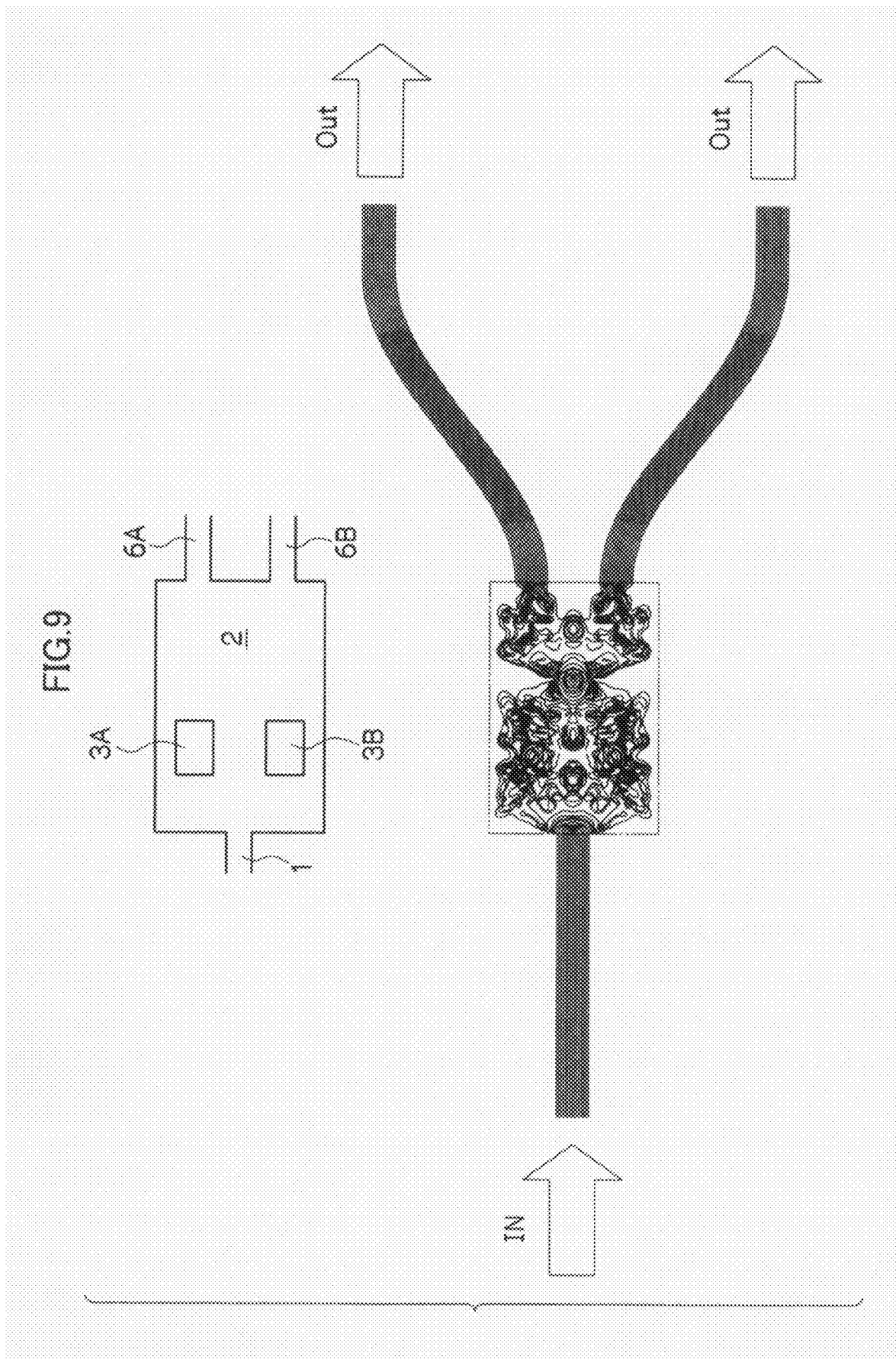
FIG. 9 is an explanatory drawing showing a state of propagation of light when voltage is not applied to the individual electrodes in the optical splitter/coupler relating to the first exemplary embodiment.

As shown in FIG. 9, when light is incident into the multimode waveguide 2 from the incident waveguide 1 in the state in which no electric field is applied to the individual electrode 3A and the individual electrode 3B of the optical splitter/coupler 100, the light which has propagated through the incident waveguide 1 in the single mode is separated into multimode light at the multimode waveguide 2, and a light image arises at the connected portion of the incident waveguide 1 and the multimode waveguide 2. In the multimode waveguide 2, because the lights propagate in the multimode, a light image is formed due to the lights interfering with one another at the interior of the multimode waveguide 2. Then, the lights, which have propagated through the multimode waveguide 2 in the multimode, are, at the connected portions of the multimode waveguide 2 and the emitting waveguide 6A and the emitting waveguide 6B, converged into single mode lights while interfering with one another. Accordingly, at these connected portions as well, light images arise, and lights of the same intensities are emitted from the emitting waveguide 6A and the emitting waveguide 6B.

Figure 10:
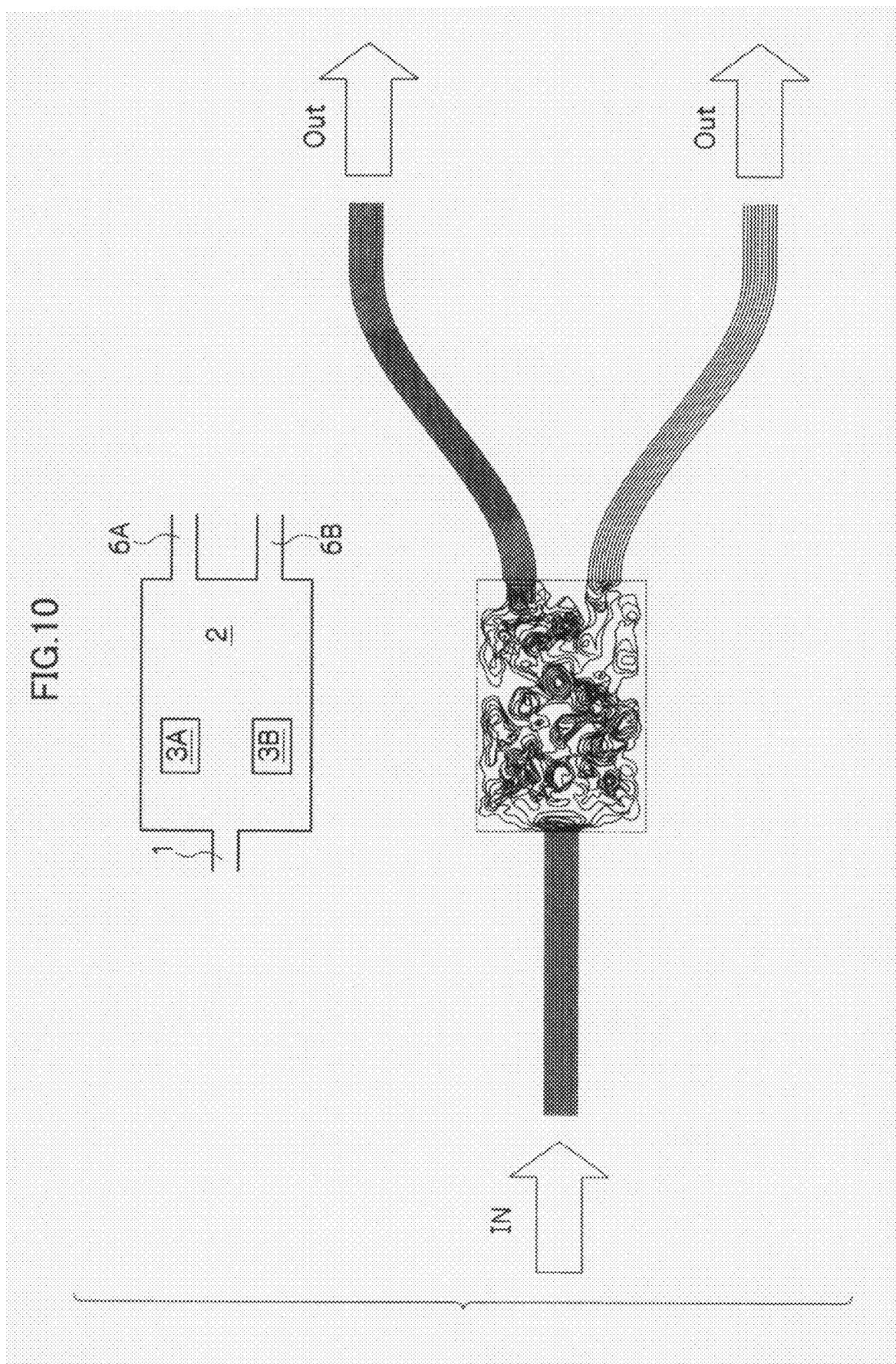
FIG. 10 is an explanatory drawing showing a state of propagation of light when voltages are applied to the individual electrodes in the optical splitter/coupler relating to the first exemplary embodiment.

Because the multimode waveguide 2 is formed of a material having the electrooptic effect, when electric fields are applied to the individual electrode 3A and the individual electrode 3B, the refractive index of the multimode waveguide 2 changes, and the refractive index changes greatly especially at the places where light images arise. Accordingly, because the patterns of the light images change as shown in FIG. 10, a difference arises in the intensities of the light emitted from the emitting waveguide 6A and the light emitted from the emitting waveguide 6B.

Figure 13:
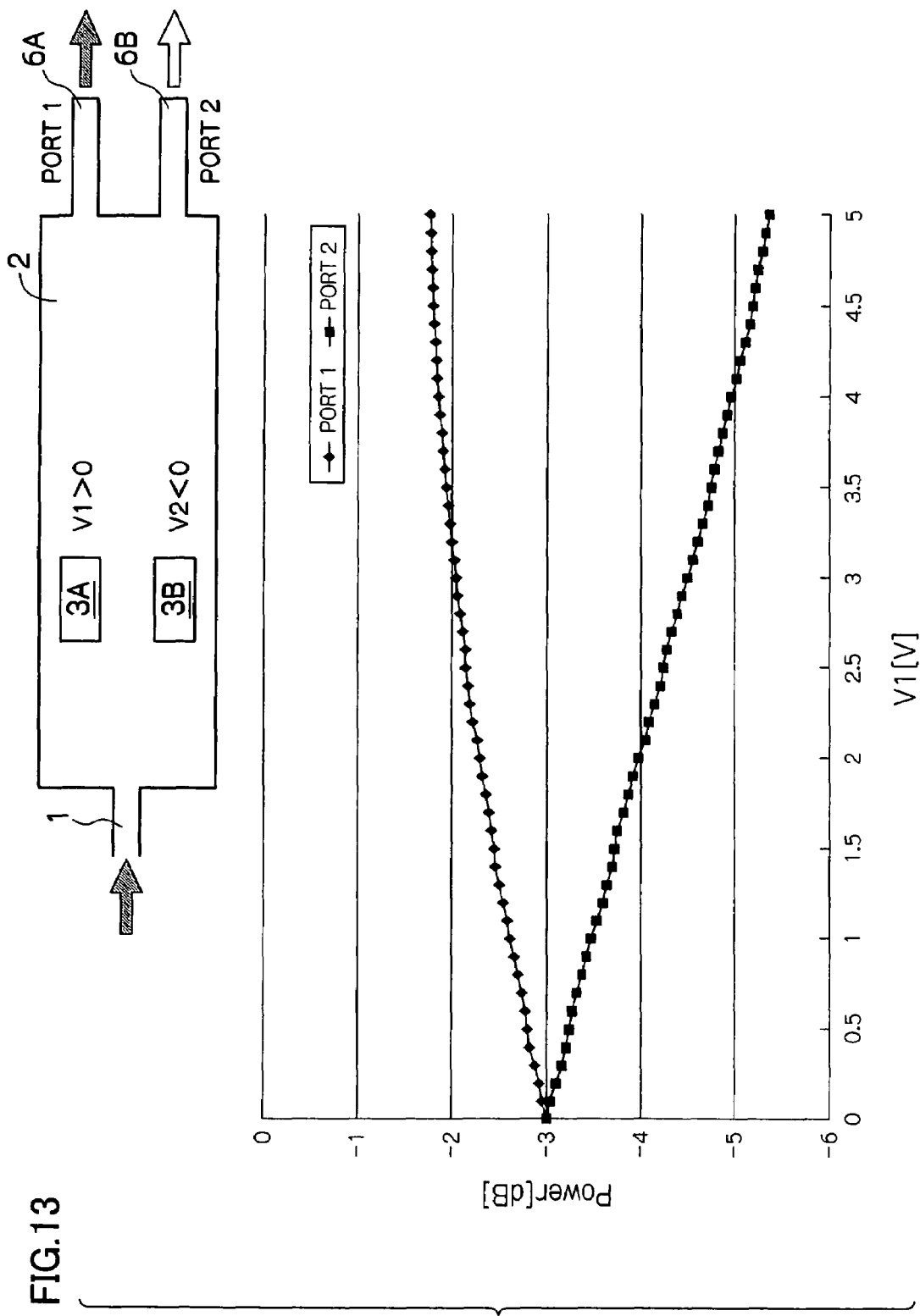
FIG. 13 is an explanatory drawing showing changes in intensities of lights guided-out from the emitting waveguides when voltages applied to the individual electrodes are changed, in the optical splitter/coupler relating to the first exemplary embodiment.

As shown in FIG. 13, when, for example, positive voltage is applied to the individual electrode 3A and negative voltage is applied to the individual electrode 3B, the intensity of the light emitted from the emitting waveguide 6A (Port 1) decreases and the intensity of the light emitted from the emitting waveguide 6B (Port 2) increases. The greater the absolute values of the voltages applied to the individual electrode 3A and the individual electrode 3B, the more the intensity of the light emitted from the emitting waveguide 6A (Port 1) decreases and the more the intensity of the light emitted from the emitting waveguide 6B (Port 2) increases.

Figure 14:
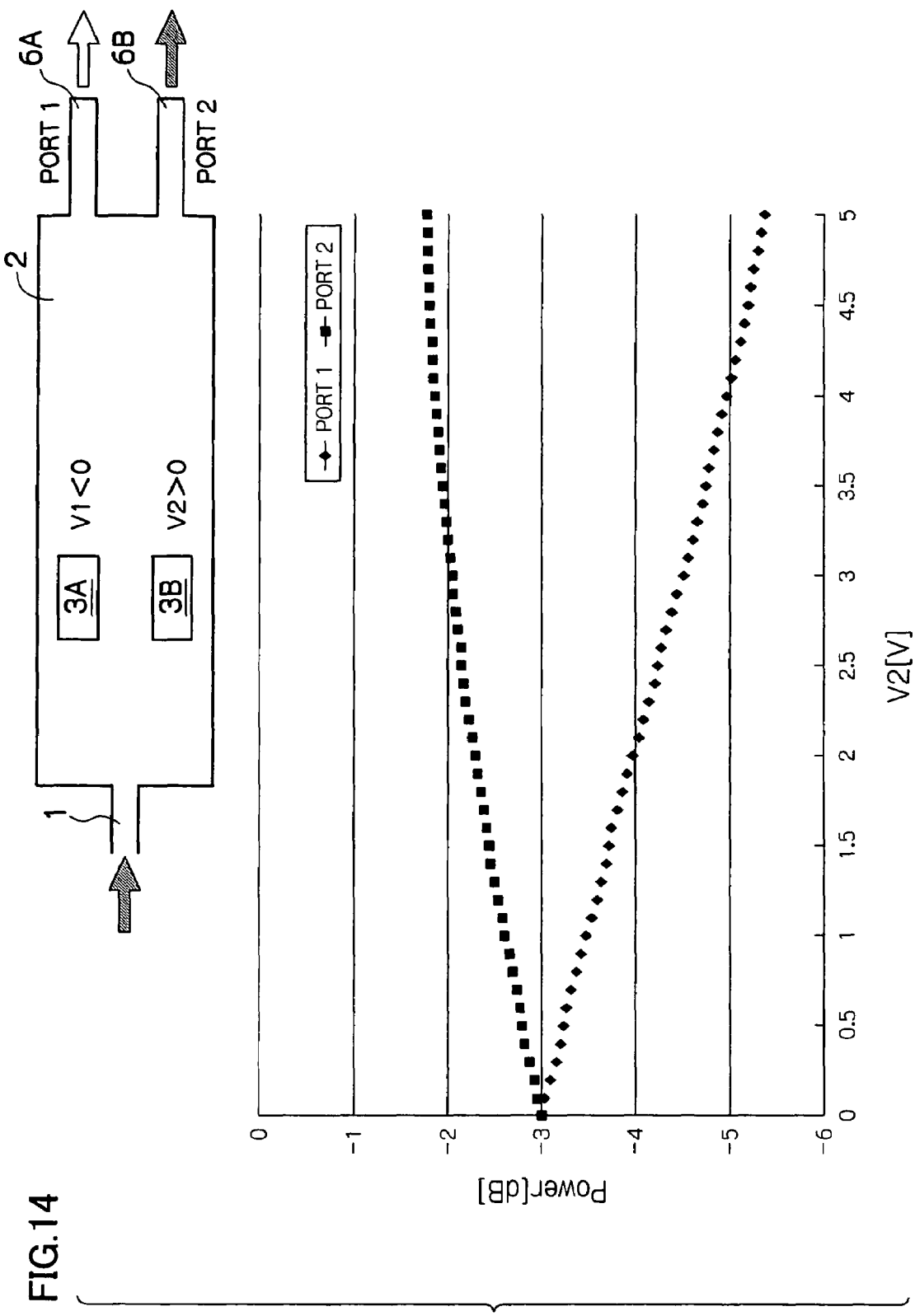
FIG. 14 is an explanatory drawing showing changes in intensities of lights guided-out from the emitting waveguides when polarities of voltages applied to the individual electrodes are reversed and the magnitudes of the voltages are changed, in the optical splitter/coupler relating to the first exemplary embodiment.

Conversely, as shown in FIG. 14, when, for example, negative voltage is applied to the individual electrode 3A and positive voltage is applied to the individual electrode 3B, the intensity of the light emitted from the emitting waveguide 6A (Port 1) increases and the intensity of the light emitted from the emitting waveguide 6B (Port 2) decreases. The greater the absolute values of the voltages applied to the individual electrode 3A and the individual electrode 3B, the more the intensity of the light emitted from the emitting waveguide 6A (Port 1) increases and the more the intensity of the light emitted from the emitting waveguide 6B (Port 2) decreases.

In this way, in the optical splitter/coupler 100, voltages are applied to the individual electrode 3A and the individual electrode 3B in order to polarize the multimode waveguide 2 in opposite polarities at the one half and at the other half across the central line running along the lengthwise direction of the multimode waveguide 2, and, by adjusting the absolute values of these voltages, the proportion of the intensities of the light emitted from the emitting waveguide 6A and the light emitted from the emitting waveguide 6B can be set in a predetermined range.

2. Second Exemplary Embodiment

Figure 7:
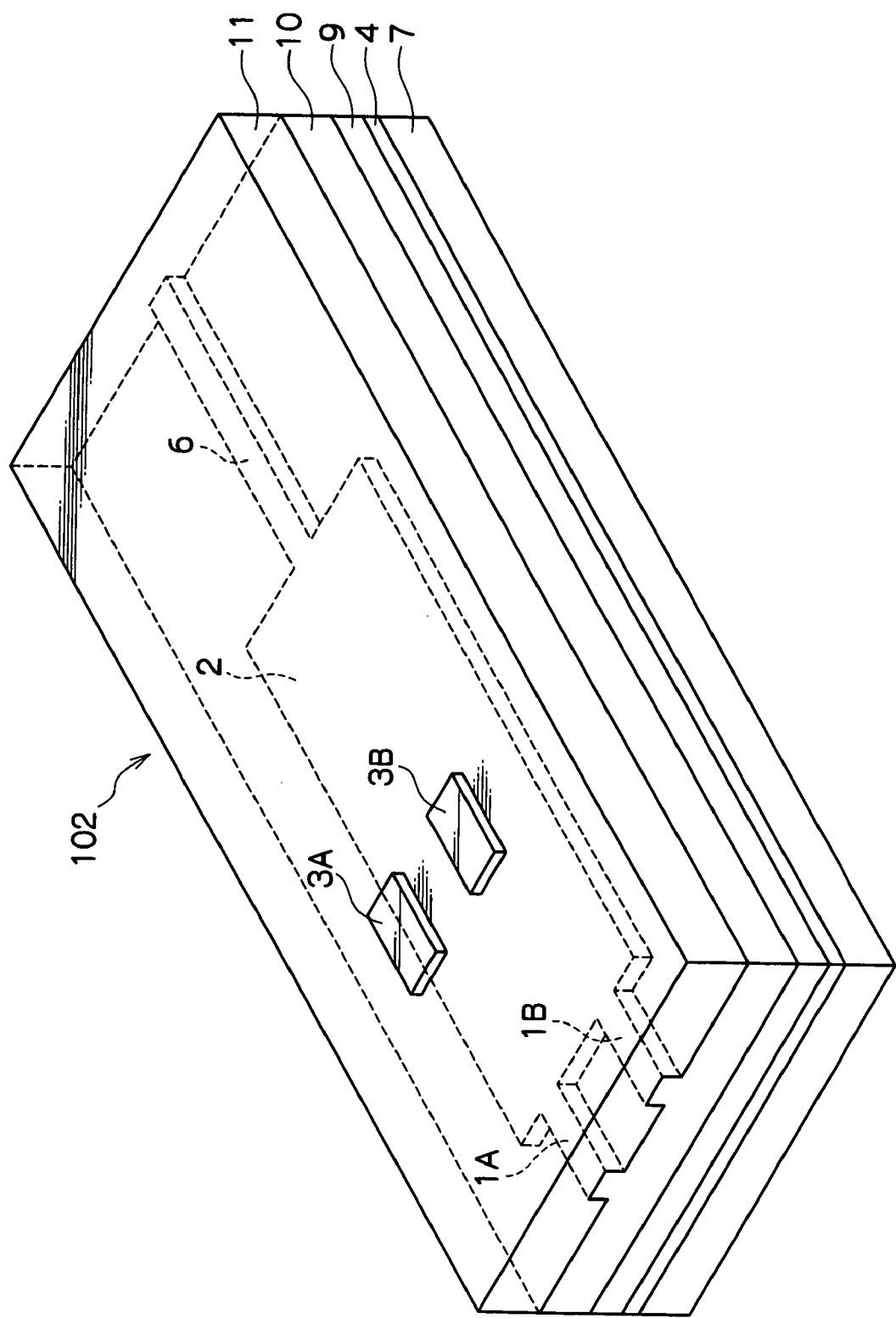
FIG. 7 is a perspective view showing the overall structure of an optical splitter/coupler relating to a second exemplary embodiment.

As shown in FIG. 7 and FIG. 8, an optical splitter/coupler 102 relating to a second exemplary embodiment has two incident waveguides which are an incident waveguide 1A and an incident waveguide 1B (upon occasion called "incident waveguides 1" when referred to collectively hereinafter), the one emitting waveguide 6, the multimode waveguide 2 to whose one end the incident waveguide 1A and the incident waveguide 1B are connected and to whose other end the emitting waveguide 6 is connected, and two individual electrodes which are the individual electrode 3A and the individual electrode 3B (upon occasion called "individual electrodes 3" when referred to collectively hereinafter) to which voltages are applied in order to modulate the light propagating within the multimode waveguide 2.

As shown in FIG. 7, the incident waveguide 1A, the incident waveguide 1B, the emitting waveguide 6, and the multimode waveguide 2 are formed integrally by the core layer 10 which is sandwiched between the lower clad layer 9 and the upper clad layer 11. The core layer 10 has a refractive index which is greater than those of the lower clad layer 9 and the upper clad layer 11. Note that the refractive indices of the lower clad layer 9 and the upper clad layer 11 may be the same or may be different.

As shown in FIG. 8, at the optical splitter/coupler 102, bright spots arise at the portions of the multimode waveguide 2 joined together with the incident waveguide 1A and the incident waveguide 1B, and the portion joined together with the emitting waveguide 6. Further, a total of three bright spots, which are two in the vicinities of both side edges at either side of a longitudinal direction central line and one on this central line, arise from the incident waveguides 1 toward the emitting waveguide 6. Accordingly, the length L is set such that a total of six bright spots, which are two bright spots, one bright spot, two bright spots, one bright spot, are formed from the incident waveguides 1 toward the emitting waveguide 6. However, the length L of the multimode waveguide 2 may be set such that, from the incident waveguides 1 toward the emitting waveguide 6, a total of nine bright spots, which are two bright spots, one bright spot, two bright spots, one bright spot, two bright spots, one bright spot, are formed, or a total of twelve bright spots, which are two bright spots, one bright spot, two bright spots, one bright spot, two bright spots, one bright spot, two bright spots, one bright spot, are formed.

As shown in FIG. 7 and FIG. 8, the individual electrodes 3 are disposed above the multimode waveguide 2 at the surface of the upper clad layer 11 on either side of the longitudinal direction central line, and are formed so as to overlap the positions of the two bright spots which are second from the upstream side, i.e., the two bright spots closest to the emitting waveguide 6, among the sets of two bright spots which arise at either side of the longitudinal direction central line.

Other than the above-described points, the optical splitter/coupler 102 has the same structure as the optical splitter/ coupler 100 relating to the first exemplary embodiment. Further, the fabrication processes also are similar.

Figure 11:
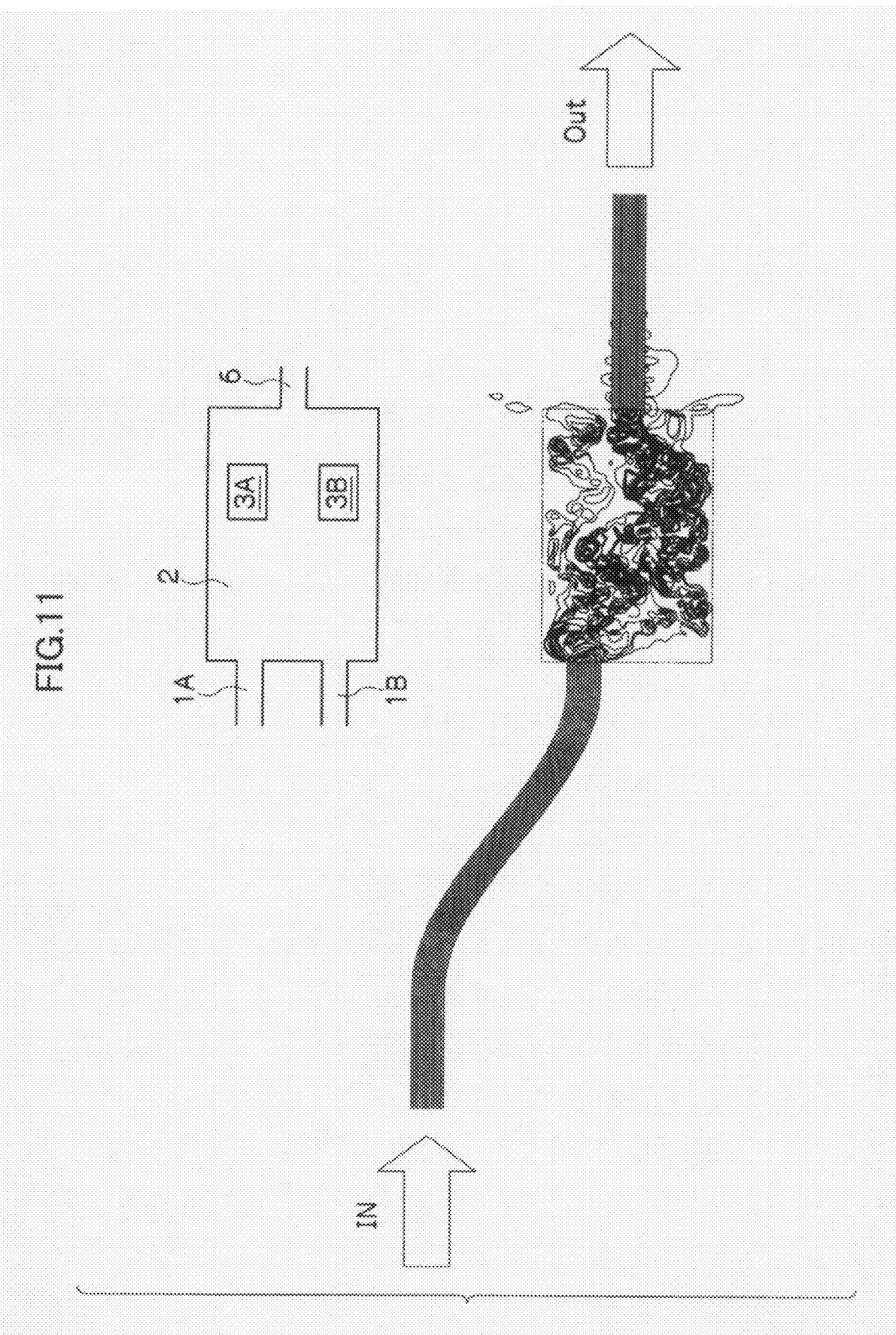
FIG. 11 is an explanatory drawing showing a state of propagation of light when positive voltage is applied to one individual electrode and negative voltage is applied to the other individual electrode, in the optical splitter/coupler relating to the second exemplary embodiment.
Figure 12:
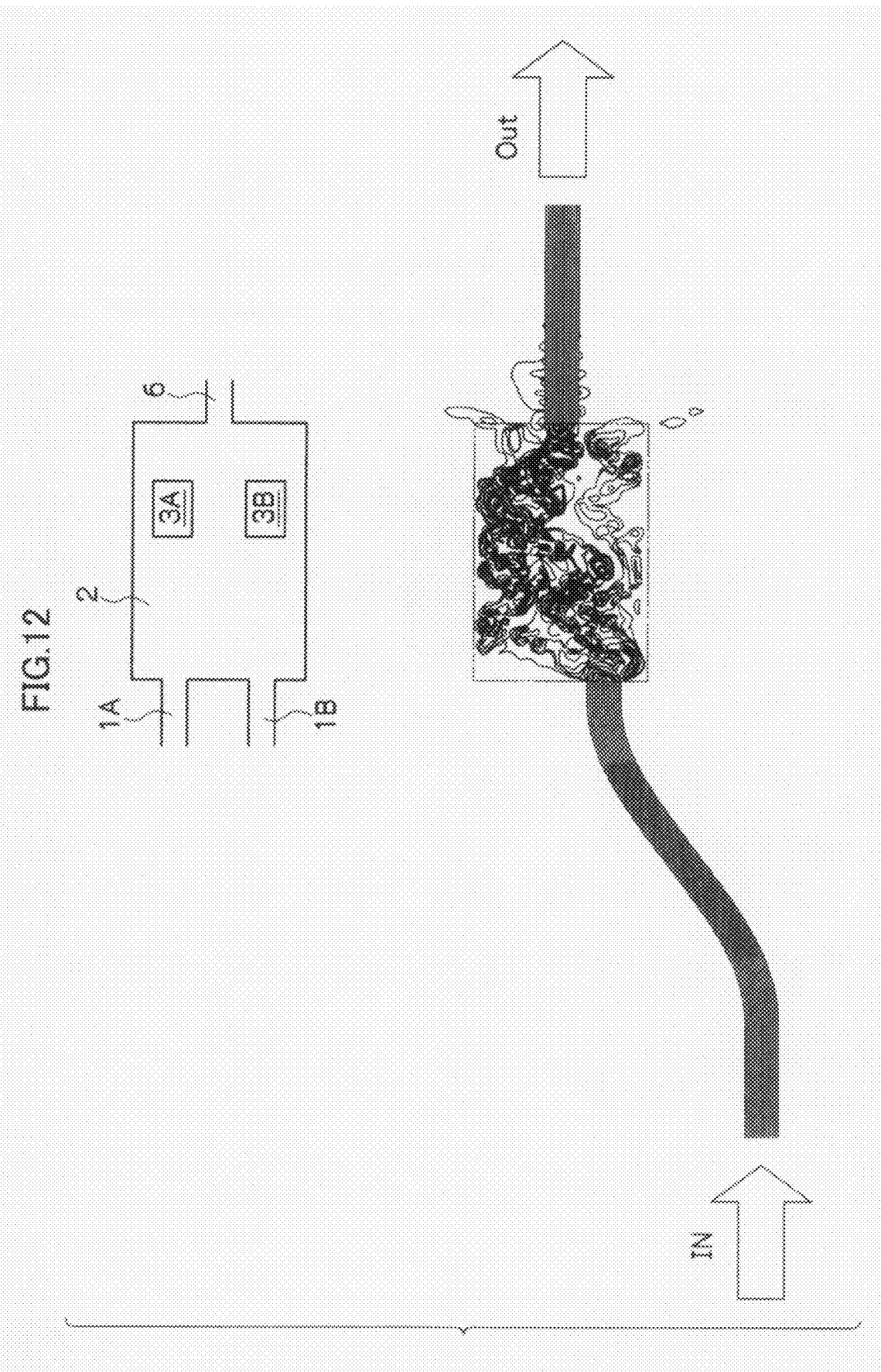
FIG. 12 is an explanatory drawing showing a state of propagation of light when polarities of voltages applied to the individual electrodes are reversed, in the optical splitter/coupler relating to the second exemplary embodiment.

In the optical splitter/coupler 102, by switching the polarities of the voltages applied to the individual electrode 3A and the individual electrode 3B, as shown in FIG. 11 and FIG. 12, the pattern of the light image formed within the multimode waveguide 2 changes and the positions of the bright spots move, and due thereto, the path on which the light propagates also changes. Accordingly, when, for example, positive voltage is applied to the individual electrode 3A and negative voltage is applied to the individual electrode 3B, as shown in FIG. 11, light which is incident from the incident waveguide 1A is guided-out from the emitting waveguide 6. On the other hand, when negative voltage is applied to the individual electrode 3A and positive voltage is applied to the individual electrode 3B, as shown in FIG. 12, light which is incident from the incident waveguide 1B is guided-out from the emitting waveguide 6.

3. Third Exemplary Embodiment

Figure 15:
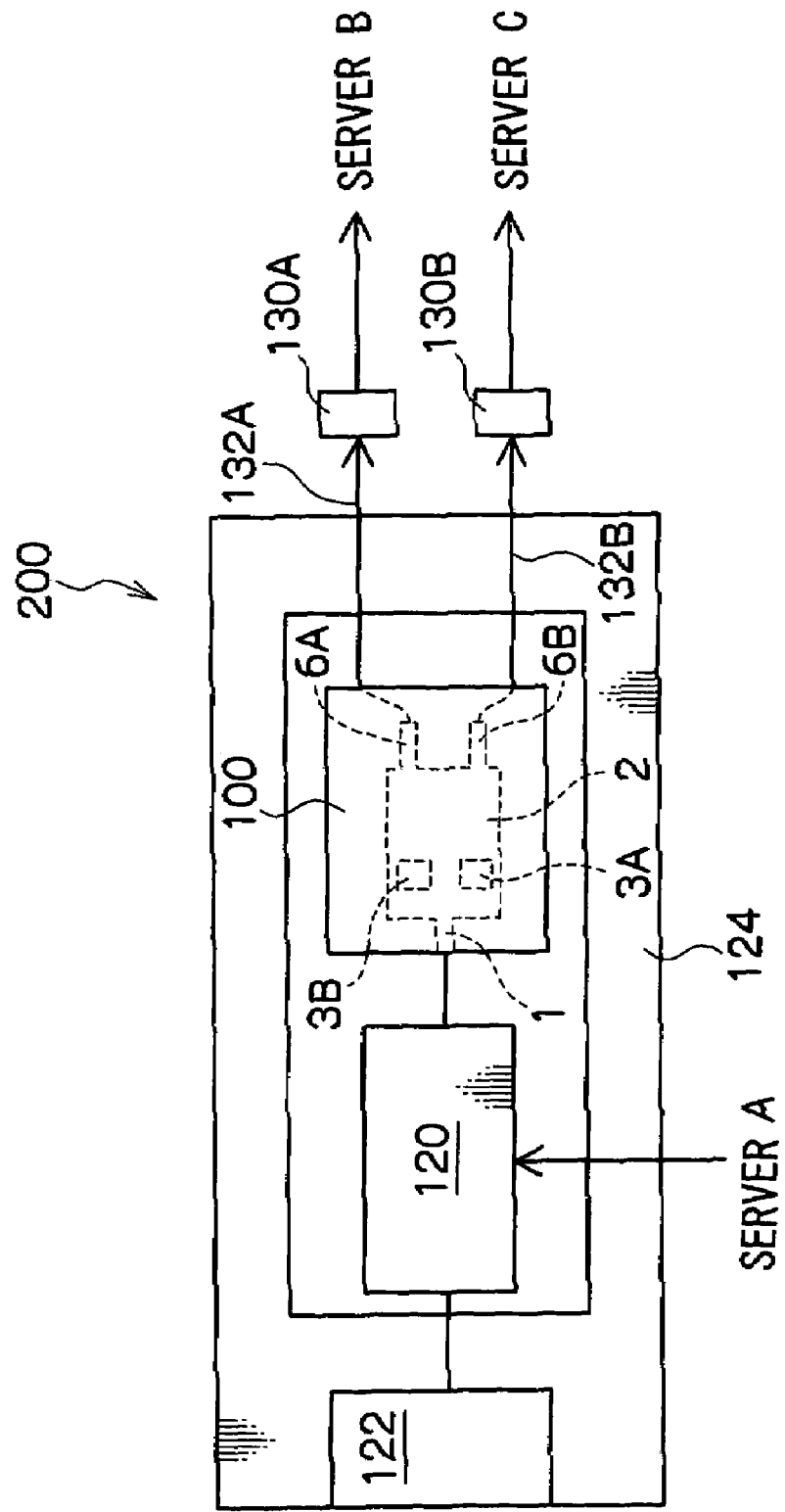
FIG. 15 is a block diagram showing the schematic structure of an example of an optical communication system using the optical splitter/coupler relating to the first exemplary embodiment.

As shown in FIG. 15, an optical communication system 200, which connects server A with server B and server C, has: a light source 122; a modulator 120 which modulates the light from the light source 122 in accordance with signals from the server A; the optical splitter/coupler 100 of the first exemplary embodiment which splits in two the light modulated at the modulator 120; a light-receiving element 130A which receives one of the lights split by the optical splitter/coupler 100 and converts it into an electric signal, and transfers the electric signal to the server B; and a light-receiving element 130B which receives the other light split by the optical splitter/coupler 100 and converts it into an electric signal, and transfers the electric signal to the server C. In the optical communication system 200, the light source 122 and the modulator 120 correspond to the transmitting section, and the light-receiving element 130A and the light-receiving element 130B correspond to the light-receiving section. Further, the light source 122, the modulator 120, and the optical splitter/coupler 100 structure a feeding section 124 which feeds-out an optical signal.

At the optical splitter/coupler 100, the incident waveguide 1 is connected to the modulator 120, the emitting waveguide 6A is connected to the light-receiving element 130A via an optical fiber 132A, and the emitting waveguide 6B is connected to the light-receiving element 130B via an optical fiber 132B. Further, the individual electrode 3A and the individual electrode 3B are connected to an optical signal control circuit (not shown). The optical signal control circuit is a circuit which generates direct currents of predetermined voltages and applies them to the individual electrode 3A and the individual electrode 3B, and functions as an optical signal controlling section.

In a case in which the distance between the server A and the server B is much greater than the distance between the server A and the server C, the optical fiber connecting the server A and the server B is longer than, and therefore, the damping of the optical signal also is greater than the optical fiber connecting the server A and the server C. Accordingly, when merely splitting the optical signal from the server A into two and feeding the signals out to the server B and the server C, the intensity of the optical signal received at the server B is much smaller than the intensity of the optical signal received at the server C.

Figure 16:
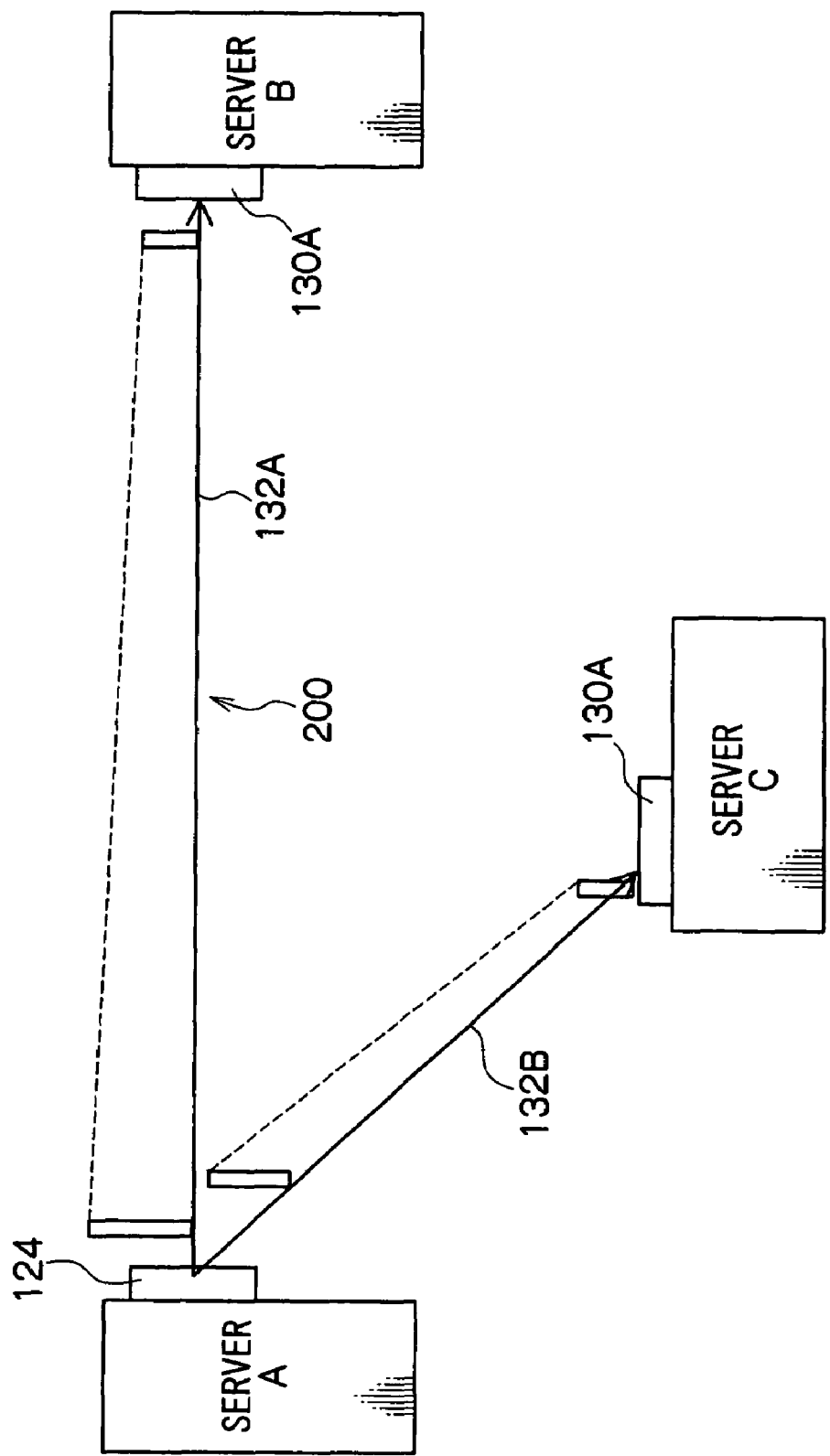
FIG. 16 is an explanatory drawing showing an example of using the optical communication system shown in FIG. 15 in communication between servers.

Thus, as shown in FIG. 16, by providing the optical communication system 200 between, on the one hand, the server A, and, on the other hand, the server B and the server C, and setting the intensity of the optical signal which is fed-out to the server B to be higher than the intensity of the optical signal which is fed-out to the server C, the intensity of the optical signal received at the server B and the intensity of the optical signal received at the server C can be made to be equal.

EXAMPLE

The optical splitter/coupler 100 was fabricated in accordance with the processes shown in FIG. 17.

Gold was vapor-deposited by VCD on the substrate 7 so as to form the ground electrode 4. An acrylic resin was spin-coated thereon and UV-cured, such that the lower clad layer 9 of a thickness of 4 μm was formed.

Then, a film, in which a chromophore such as Disperse Red 1 or FTC (2-dicyanomethylene-3-cyano-4-{2-[trans-(4-N,N-diacetoxyethyl-amino)phenylene-3,4-di butylene-5]vinyl}-5,5-dimethyl-2,5-dihydrofuran) was dispersed in polysulfone or polycarbonate, and was spin-coated on the lower clad layer 9 and heated and cured, such that the core layer 10 of a thickness of 3.3 μm was formed.

Next, the core layer was etched such that the incident waveguide 1, the multimode waveguide 2, and the emitting waveguides 6A and 6B were formed. The width $W_1$ of the incident waveguide 1 and the emitting waveguides 6 was 5 μm, and the width $W_2$ of the multimode waveguide 2 was 40 μm. Accordingly, $W_2/W_1=8$. The length L of the multimode waveguide 2 was 3105 μm. Furthermore, the distances from the both side edges of the multimode waveguide 2 to the central lines of the emitting waveguides 6A and 6B were 10 μm respectively. The core layer 10 was etched such that the thickness of the portion at the peripheries of the incident waveguide 1, the multimode waveguide 2, and the emitting waveguides 6 was 2.6 μm.

After the incident waveguide 1, the multimode waveguide 2, and the emitting waveguides 6 were formed at the core layer 10, an acrylic resin, which was similar to that used in forming the lower clad layer 9, was spin-coated thereon to a thickness of 4 μm, and was UV-cured. The refractive indices of the lower clad layer 9 and the upper clad layer 11 were 1.5437, and the refractive index of the core layer 10 was 1.6563.

After the upper clad layer 11 was formed, gold was vapor-deposited thereon so as to form the seed electrodes 12. After the seed electrodes 12 were formed, voltage of 400 to 2000 V was applied between the ground electrode 4 and the seed electrodes 12 at a high temperature of 90 to 250° C., and cooling to normal temperature was carried in the state in which this voltage was applied, and the core layer 10 was polarization orienting processed.

After the polarization orienting processing was finished, the seed electrodes 12 were etched and removed, and the individual electrode 3A and the individual electrode 3B, which were length 500 μm×width 10 μm, were formed by gold plating, and the optical splitter/coupler 100 was fabricated.

As shown in FIG. 13, when light was introduced into the incident waveguide 1 in a state in which voltage was not applied to the individual electrode 3A and the individual electrode 3B, light of an output of 3 dB was guided-out from the emitting waveguide 6A and the emitting waveguide 6B. This shows that, at the optical splitter/coupler 100, the light which was introduced-in from the incident waveguide 1 was split equally and guided-out from the emitting waveguide 6A and the emitting waveguide 6B.

Next, when the voltage applied to the individual electrode 3A was changed from 0 V to +5 V and the voltage applied to the individual electrode 3B was changed from 0 V to −5 V, the output of the light emitted from the emitting waveguide 6A decreased to 1.5 dB, and the output of the light emitted from the emitting waveguide 6B increased to 5.4 dB.

Conversely, when the voltage applied to the individual electrode 3A was changed from 0 V to −5 V and the voltage applied to the individual electrode 3B was changed from 0 V to +5 V, the output of the light emitted from the emitting waveguide 6A increased to 5.4 dB, and the output of the light emitted from the emitting waveguide 6B decreased to 1.5 dB.

What is claimed is:

1. An optical splitter/coupler comprising:
   a multimode waveguide having an electrooptic effect, and propagating multimode light;
   one incident waveguide propagating single mode light, and inputting the single mode light to one end of the multimode waveguide;
   one pair of emitting waveguides guiding-out a single mode lights which have propagated through the multimode waveguide;
   at least one pair of individual electrodes provided so as to be positioned in vicinities of respective side edges of the multimode waveguide, on one surface of the multimode waveguide; and
   a ground electrode provided on another surface of the multimode waveguide,
   wherein the multimode waveguide has a length such that 3(n+1) (where n is a natural number) bright spots arise at a central portion and at both side edge portions due to the single mode light incident from the incident waveguide,
   the individual electrodes are provided in a pair at positions corresponding to an upstream-most one pair of the bright spots, and
   the emitting waveguides are connected to positions corresponding to a downstream-most one pair of the bright spots at the multimode waveguide.

2. An optical splitter/coupler comprising:
   a multimode waveguide having an electrooptic effect, and propagating multimode light;
   one pair of incident waveguides propagating single mode lights, and inputting the single mode lights to one end of the multimode waveguide;
   one emitting waveguide guiding-out a single mode light which has propagated through the multimode waveguide;
   at least one pair of individual electrodes provided so as to be positioned in vicinities of respective side edges of the multimode waveguide, on one surface of the multimode waveguide; and
   a ground electrode provided on another surface of the multimode waveguide,
   wherein the multimode waveguide has a length such that 3(n+1) (where n is a natural number) bright spots arise at a central portion and at both side edge portions due to the single mode lights incident from the incident waveguides,
   the individual electrodes are provided at positions corresponding to a one pair of the bright spots which one pair is second from an upstream side, and
   the emitting waveguide is connected to a position corresponding to a downstream-most one of the bright spots at the multimode waveguide.

3. The optical splitter/coupler of claim 1, wherein two pairs of the individual electrodes are provided at positions corresponding to two pairs of the bright spots which are the upstream-most pair and a pair second from an upstream side.

4. The optical splitter/coupler of claim 2, wherein two pairs of the individual electrodes are provided at positions corresponding to two pairs of the bright spots which are the pair second from and a pair third from the upstream side.

5. The optical splitter/coupler of claim 1, wherein the multimode waveguide is provided with an electrooptic effect by being subjected to polarizing processing by electric fields in a same direction being applied to the multimode waveguide overall.

6. The optical splitter/coupler of claim 2, wherein the multimode waveguide is provided with an electrooptic effect by being subjected to polarizing processing by electric fields in a same direction being applied to the multimode waveguide overall.

7. The optical splitter/coupler of claim 1, wherein the multimode waveguide is provided with an electrooptic effect by being subjected to polarizing processing by electric fields in mutually opposite directions being applied at respective sides of a longitudinal direction central line.

8. The optical splitter/coupler of claim 2, wherein the multimode waveguide is provided with an electrooptic effect by being subjected to polarizing processing by electric fields in mutually opposite directions being applied at respective sides of a longitudinal direction central line.

9. The optical splitter/coupler of claim 1, wherein, given that a width of the incident waveguide and the emitting waveguides is $W_1$ and a width of the multimode waveguide is $W_2$, $2 \leq W_2/W_1 \leq 100$.

10. The optical splitter/coupler of claim 2, wherein, given that a width of the incident waveguides and the emitting waveguide is $W_1$ and a width of the multimode waveguide is $W_2$, $2 \leq W_2/W_1 \leq 100$.

11. The optical splitter/coupler of claim 1, further comprising:
    a substrate;
    a lower clad layer formed on the substrate;
    an upper clad layer positioned above the lower clad layer; and
    a core layer sandwiched between the lower clad layer and the upper clad layer, and forming the multimode waveguide, the incident waveguide, and the emitting waveguides,
    wherein the core layer has a refractive index which is greater than both a refractive index of the upper clad layer and a refractive index of the lower clad layer, and
    the individual electrodes are formed on a surface of or above the upper clad layer, and the ground electrode is formed between the substrate and a lower electrode.

12. The optical splitter/coupler of claim 2, further comprising:
    a substrate;
    a lower clad layer formed on the substrate;
    an upper clad layer positioned above the lower clad layer; and
    a core layer sandwiched between the lower clad layer and the upper clad layer, and forming the multimode waveguide, the incident waveguides, and the emitting waveguide,
    wherein the core layer has a refractive index which is greater than both a refractive index of the upper clad layer and a refractive index of the lower clad layer, and
    the individual electrodes are formed on a surface of or above the upper clad layer, and the ground electrode is formed between the substrate and a lower electrode.

13. The optical splitter/coupler of claim 11, wherein the multimode waveguide is a waveguide of a ribbed structure in which the core layer projects-out in a rib shape toward the upper clad layer.

14. The optical splitter/coupler of claim 12, wherein the multimode waveguide is a waveguide of a ribbed structure in which the core layer projects-out in a rib shape toward the upper clad layer.

15. The optical splitter/coupler of claim 11, wherein the multimode waveguide is a waveguide of an inverse-ribbed structure in which the core layer projects-out in a rib shape toward the lower clad layer.

16. The optical splitter/coupler of claim 12, wherein the multimode waveguide is a waveguide of an inverse-ribbed structure in which the core layer projects-out in a rib shape toward the lower clad layer.

17. An optical communication system comprising:
the optical splitter/coupler of claim 1;
one or plural transmitting sections connected to the incident waveguide of the optical splitter/coupler;
one or plural receiving sections connected to the emitting waveguides of the optical splitter/coupler; and
an optical signal controlling section applying voltages to the individual electrodes of the optical splitter/coupler, and controlling splitting of light at the optical splitter/coupler.

18. An optical communication system comprising:
the optical splitter/coupler of claim 2;
one or plural transmitting sections connected to the incident waveguides of the optical splitter/coupler;
one or plural receiving sections connected to the emitting waveguide of the optical splitter/coupler; and
an optical signal controlling section applying voltages to the individual electrodes of the optical splitter/coupler, and controlling splitting of light at the optical splitter/coupler.

19. An optical splitter/coupler comprising:
a multimode waveguide having an electrooptic effect, and propagating multimode light;
one incident waveguide propagating a single mode light, and inputting the single mode light to one end of the multimode waveguide;
one pair of emitting waveguides guiding-out a single mode lights which have propagated-in through the multimode waveguide;
at least one pair of individual electrodes provided so as to be positioned in vicinities of respective side edges of the multimode waveguide, on one surface of the multimode waveguide; and
a ground electrode provided on another surface of the multimode waveguide,
wherein the multimode waveguide has a length such that $3(n+1)$ (where n is a natural number) bright spots arise at a central portion and at both side edge portions due to the single mode light incident from the incident waveguide,
the individual electrodes are provided in pairs at predetermined positions, and
the emitting waveguides are connected to positions corresponding to a downstream-most one pair of the bright spots at the multimode waveguide.

20. The optical splitter/coupler of claim 19, wherein the predetermined positions of the individual electrodes are positions corresponding to an upstream-most one pair of the bright spots.

21. The optical splitter/coupler of claim 19, wherein the predetermined positions of the individual electrodes are positions corresponding to a one pair of the bright spots which is second from an upstream side.

22. An optical communication system comprising:
the optical splitter/coupler of claim 19;
one or plural transmitting sections connected to the incident waveguide of the optical splitter/coupler;
one or plural receiving sections connected to the emitting waveguides of the optical splitter/coupler; and
an optical signal controlling section applying voltages to the individual electrodes of the optical splitter/coupler, and controlling splitting of light at the optical splitter/coupler.

* * * * *